Patented Aug. 21, 1951

2,564,992

UNITED STATES PATENT OFFICE 2,564,992

RUBBER REINFORCING PIGMENT

Alphonse Pechukas, Akron, Ohio, assignor to Pittsburgh Plate Glass Company, Allegheny County, Pa., a corporation of Pennsylvania No Drawing. Application July 30, 1946, Serial No. 687,223

5 Claims. (Cl. 106—306)

The present invention relates to pigmentary materials and more particularly to an improved rubber reinforcing pigment based upon finely divided hydrated calcium silicate.

In the preparation of compounded rubber products, various fillers and pigments are employed to extend the stock, to improve the flexibility, to enhance the tensile strength, or otherwise to modify the various physical properties of the final product. Zinc oxide, finely divided calcium carbonate, specially prepared aluminum hydrate and carbon black are typical of the pigmentary materials commonly employed. More recently, finely divided hydrated calcium silicate has gained considerable prominence as a reinforcing rubber pigment. This pigmentary hydrated calcium silicate enables the compounding of stiff, tough, hard stocks which, when vulcanized in the usual manner, are converted into products having excellent abrasion resistance qualities. In addition vulcanizates of this type exhibit good tear resistance and also show considerable resistance to heat and ageing.

Finely divided hydrated calcium silicate, however, when employed as a reinforcing pigment, increases the hysteresis of synthetic rubber vulcanizates, as characterized by the heat build-up under dynamic tension. Natural rubber stocks containing pigmentary hydrated calcium silicate frequently require longer curing times for adequate vulcanization than do rubber stocks processed with other pigmentary materials. Manifestly, therefore, the advantages to be gained by using hydrated calcium silicate pigment in a rubber stock are somewhat offset by the accompanying disadvantages incident to such use.

One object of this invention is to provide a modified hydrated calcium silicate pigment which will enable the production of superior rubber vulcanizates.

A second object of the invention is to provide a modified hydrated calcium silicate pigment which can be used with synthetic rubber stocks to form vulcanizates having excellent hysteresis properties.

Other objects and advantages of my invention will be readily apparent from the following detailed description of certain preferred embodiments thereof.

I have discovered, and the present invention is based upon the discovery that the incorporation of small amounts of an alcohol, such as ethylene, glycol, propylene glycol, glycerol, and diethylene glycol, in finely divided hydrated calcium silicate produces a modified pigment, which not only retains its full reinforcing properties for rubber stocks, but at the same time, enables the production of vulcanizates exhibiting materially reduced hysteresis under shortened periods of cure.

In practicing the invention pigmentary hydrated calcium silicate is prepared in the customary manner by precipitation from an aqueous solution of a soluble calcium salt, generally calcium chloride. The precipitation is conducted by interaction of the calcium salt solution with a suitable, soluble alkali metal silicate. Operating conditions, so selected as to maintain the particle size of the precipitate at a minimum, are observed. For example, the introduction of a sodium silicate solution, containing about 100 grams of $SiO_2$ per liter, into a concentrated solution of calcium chloride containing not less than 50 grams and preferably not less than 75 grams of the calcium salt per liter, with vigorous agitation forms a suitable product. Other concentrations of reactants and modifications in procedural details will also enable the formation of a satisfactory product.

The precipitated calcium silicate may be recovered by decantation or filtration and is dried at a temperature sufficiently high to remove any water which would otherwise be driven off during vulcanization, for example, about 150° C. or above. The dried material, which usually is in the form of agglomerates is treated with an alcohol in an amount ranging from 2 to 9 per cent by weight. The alcohol may be added to the pigment in any convenient way. I have found that a spray of alcohol directed onto the pigment shortly after it is conveyed from the drier is highly satisfactory although other methods of treatment could be employed. After the pigment and alcohol are combined, the modified pigment is ground or pulverized in order to reduce the agglomerates or pellets formed during drying. The final product is very white and has an average particle size of less than 1 micron.

In order to demonstrate the advantages of my improved pigment, vulcanizates of rubber stocks compounded therewith will be compared with vulcanizates of rubber stocks compounded with untreated pigments. Vulcanizates of GR-S or Buna-S, a synthetic rubber which is a copolymer containing 75% of butadiene-1,3 and 25% of styrene, were selected for tests inasmuch as they are not only typical of commercial synthetic rubbers but they are also most widely used. Vulcanizates of natural rubber have also been tested to show the effect of the modified pigments thereon.

The following composition was prepared:

| | Parts by weight |
|---|---|
| GR-S | 100.0 |
| Zinc oxide | 5.0 |
| Light processing oil | 5.0 |
| Sulfur | 3.5 |
| Lead dithiocarbamate | 1.3 |
| Phenyl-beta-naphthylamine | 1.0 | and mixed by blending the several ingredients on a roll mill in a conventional manner to form the base stock.

A number of batches composed of one hundred volumes of the base stock and 30 volumes (66.9 parts by weight) of hydrated calcium silicate, untreated and modified with various alcohols, were prepared and test vulcanizates thereof produced. These vulcanizates were tested according to A. S. T. M. standard methods. The heat build-up was determined with a Goodrich flexometer, with an initial temperature of 100° F., a load of 175 pounds per square inch, a stroke of 0.175 inch and a running time of 20 minutes. The results of the test are given in the following table. In the samples, the additive is based upon the amount of hydrated calcium silicate.

Table I

| | Minutes Cure at 280° F. | Tensile at Break, p. s. i. | Heat Build-up, Degrees F. |
|---|---|---|---|
| Additive, None | 60 | 1,276 | 151 |
| | 90 | | 132 |
| 4.2% Octyl Alcohol | 60 | 1,375 | 147 |
| | 90 | | 128 |
| 5.2% Butyl Carbitol | 60 | 1,390 | 109 |
| | 90 | | 97 |
| 2% Ethylene Glycol | 60 | 1,461 | 94 |
| | 90 | 1,418 | 81 |
| 4% Ethylene Glycol | 60 | 1,687 | 84 |
| | 90 | 1,531 | 78 |
| 3.4% Diethylene Glycol | 60 | 1,546 | 73 |
| | 90 | 1,446 | 76 |
| 2.5% Propylene Glycol | 60 | 1,446 | 88 |
| | 90 | | 85 |
| 3% Glycerol | 60 | 1,361 | 90 |
| | 90 | 1,441 | 85 |

These data indicate clearly the improved hysteresis obtained in GR-S vulcanizates through the incorporation therein of hydrated calcium silicate modified by treatment with an alcohol. The rate of cure was also increased.

Hydrated calcium silicate modified with ethylene glycol increases the rate of cure in GR-I, a synthetic rubber which is a copolymer containing 97% of isobutylene and 3% of isoprene, and natural rubber stocks.

The following stocks were prepared by mixing on a standard mill (parts by weight):

| Stock | 2 | 3 |
|---|---|---|
| GR-I | 100.0 | 100.0 |
| Zinc oxide | 5.0 | 5.0 |
| Sulfur | 2.0 | 2.0 |
| Tetramethyl Thiuram Disulfide | 1.0 | 1.0 |
| Mercaptobenzothiazole | 0.5 | 0.5 |
| Stearic Acid | 1.0 | 1.0 |
| Iron Oxide | 5.0 | 5.0 |
| Soft Clay | 50.0 | 50.0 |
| Hydrated Calcium Silicate | 30.0 | |
| Hydrated Calcium Silicate modified with 6% by weight of ethylene glycol | | 31.8 |

Samples of these compositions were vulcanized at 316° F. for varying lengths of time, and tested for tensile strength according to standard A. S. T. M. procedure. The results of the tests are given in the following table:

Table II

| Stock | Minutes Cure at 316° F. | Tensile at Break p. s. i. |
|---|---|---|
| 2 | 5 | 936 |
| | 7.5 | 1,191 |
| | 10 | 1,276 |
| | 15 | 1,418 |
| | 20 | 1,517 |
| 3 | 5 | 1,432 |
| | 7.5 | 1,475 |
| | 10 | 1,560 |
| | 15 | 1,631 |
| | 20 | 1,617 |

These tests show superior tensile strengths are present in synthetic rubber stocks compounded with hydrated calcium silicate which has been modified with a polyhydric alcohol, ethylene glycol.

Natural rubber stocks containing the following ingredients were prepared (parts by weight):

| Stock | 4 | 5 |
|---|---|---|
| Rubber | 100.0 | 100.0 |
| Zinc Oxide | 5.0 | 5.0 |
| Sulfur | 2.5 | 2.5 |
| Stearic Acid | 1.0 | 1.0 |
| Benzothiazyl Disulfide | 1.25 | 1.25 |
| Hydrated Calcium Silicate | 45.6 | |
| Hydrated Calcium Silicate modified with 6% of ethylene glycol | | 48.3 |

Samples of these stocks were vulcanized at 287° F. for varying lengths of time and tested for tensile strengths. The results of the test are given in the following table:

Table III

| Stock | Minutes Cure at 287° F. | Tensile at Break, p. s. i. |
|---|---|---|
| 4 | 5 | 1,886 |
| | 10 | 2,949 |
| | 20 | 2,949 |
| | 30 | 3,006 |
| | 45 | 2,708 |
| 5 | 5 | 3,347 |
| | 10 | 3,474 |
| | 20 | 3,318 |
| | 30 | 3,205 |
| | 45 | 2,893 |

It is seen that natural rubber vulcanizates of increased tensile strengths result from rubber stocks compounded with an alcohol modified hydrated calcium silicate. The recorded decrease in tensile strengths after prolonged cure is typical in overcured natural rubber.

The invention has been described with particular relation to typical rubber stocks, both synthetic and natural. Similar advantages will be achieved through compounding other types of rubber stocks with alcohol modified hydrated calcium silicate. In addition, various compounding and vulcanizing ingredients generally employed for special batches, including carbon black, calcium carbonate, aluminum hydrate, accelerators, antioxidants and the like may be included in the compositions herein described.

The modification of the hydrated calcium silicate can also be accomplished by processes other than that indicated herein to be preferred. For example, where the modifying alcohol has a particularly high boiling point; such as, ethylene glycol or glycerol, it may be added to the hydrated calcium silicate slurry before the drying thereof.

Again I have found that a satisfactorily modified pigment can be produced by treating the hydrated calcium silicate with ethylene oxide or other epoxide which is readily adsorbed on the surface of the hydrated calcium silicate, similar to the adsorption thereon of the alcohol.

Other modifications and variations will be apparent to those skilled in the art and are possible without departing from the spirit and scope of my invention as defined in the appended claims.

What I claim is:

1. Finely divided hydrated calcium silicate having an average particle size of less than 1 micron and having adsorbed thereon a polyhydric alcohol of the group consisting of ethylene glycol, propylene glycol, glycerol, and diethylene glycol.

2. Finely divided hydrated calcium silicate having an average particle size of less than 1 micron and having adsorbed thereon from 2 to 9 per cent by weight of a polyhydric alcohol of the group consisting of ethylene glycol, propylene glycol, glycerol, and diethylene glycol.

3. Finely divided hydrated calcium silicate having an average particle size of less than 1 micron and having adsorbed thereon from 2 to 9 per cent by weight of ethylene glycol.

4. Finely divided hydrated calcium silicate having an average particle size of less than 1 micron and having adsorbed thereon approximately 6% by weight of ethylene glycol.

5. Finely divided hydrated calcium silicate having an average particle size of less than 1 micron and having adsorbed thereon ethylene glycol.

ALPHONSE PECHUKAS.

REFERENCES CITED

The following references are of record in the file of this patent:

UNITED STATES PATENTS

| Number | Name | Date |
|---|---|---|
| 1,824,177 | Taylor | Sept. 22, 1931 |
| 1,842,394 | Endres | Jan. 26, 1932 |
| 2,015,234 | Rodman | Sept. 24, 1935 |
| 2,204,113 | Allen | June 11, 1940 |
| 2,296,382 | Fischer | Sept. 22, 1942 |
| 2,314,188 | Allen | Mar. 16, 1943 |
| 2,361,515 | Weidlich | Oct. 31, 1944 |